United States Patent [19]

Anderson

[11] 4,378,052
[45] Mar. 29, 1983

[54] ARTICULATED TRACTOR ATTACHMENT WITH ROLLER

[76] Inventor: Ernest L. Anderson, 85115 Florence Rd., Eugene, Oreg. 97405

[21] Appl. No.: 253,900

[22] Filed: Apr. 13, 1981

[51] Int. Cl.³ ............................................ A01B 59/043
[52] U.S. Cl. .................................. 172/449; 172/250; 172/610; 404/129
[58] Field of Search ................. 172/449, 448, 21, 447, 172/451, 150, 518, 250, 539, 554, 450, 459, 776, 610; 404/129, 130, 122, 128

[56] References Cited

U.S. PATENT DOCUMENTS

| | | | |
|---|---|---|---|
| 1,237,406 | 8/1917 | Stoner | 404/129 |
| 2,531,768 | 11/1950 | Cline | 172/449 X |
| 2,986,977 | 6/1961 | Swenson | 404/122 |
| 3,034,238 | 5/1962 | McGee | 172/719 X |
| 3,794,121 | 2/1974 | Drozak | 172/21 |
| 4,069,874 | 1/1978 | Buck | 172/451 |
| 4,245,458 | 1/1981 | Smith | 172/451 |

Primary Examiner—Richard J. Johnson
Attorney, Agent, or Firm—James D. Givnan, Jr.

[57] ABSTRACT

A clevis-shaped bracket including an A-frame is adapted for attachment to the three point hitch of a tractor. A roller supporting frame is mounted within the bracket for articulated movement about the vertical axis of a pivot located within the hitch supported bracket to provide a short turning radius for tractor and attachment. The roller equipped frame includes a walled structure which serves as a water tank. A hydraulic cylinder is disposed intermediate the tractor hitch bar and the attachment in an inclined manner to bias the attachment downwardly to increase ground pressure. An adjustable frame is provided with telescopic beam members to mount rollers of increased length or other ground bearing instrumentalities.

6 Claims, 3 Drawing Figures

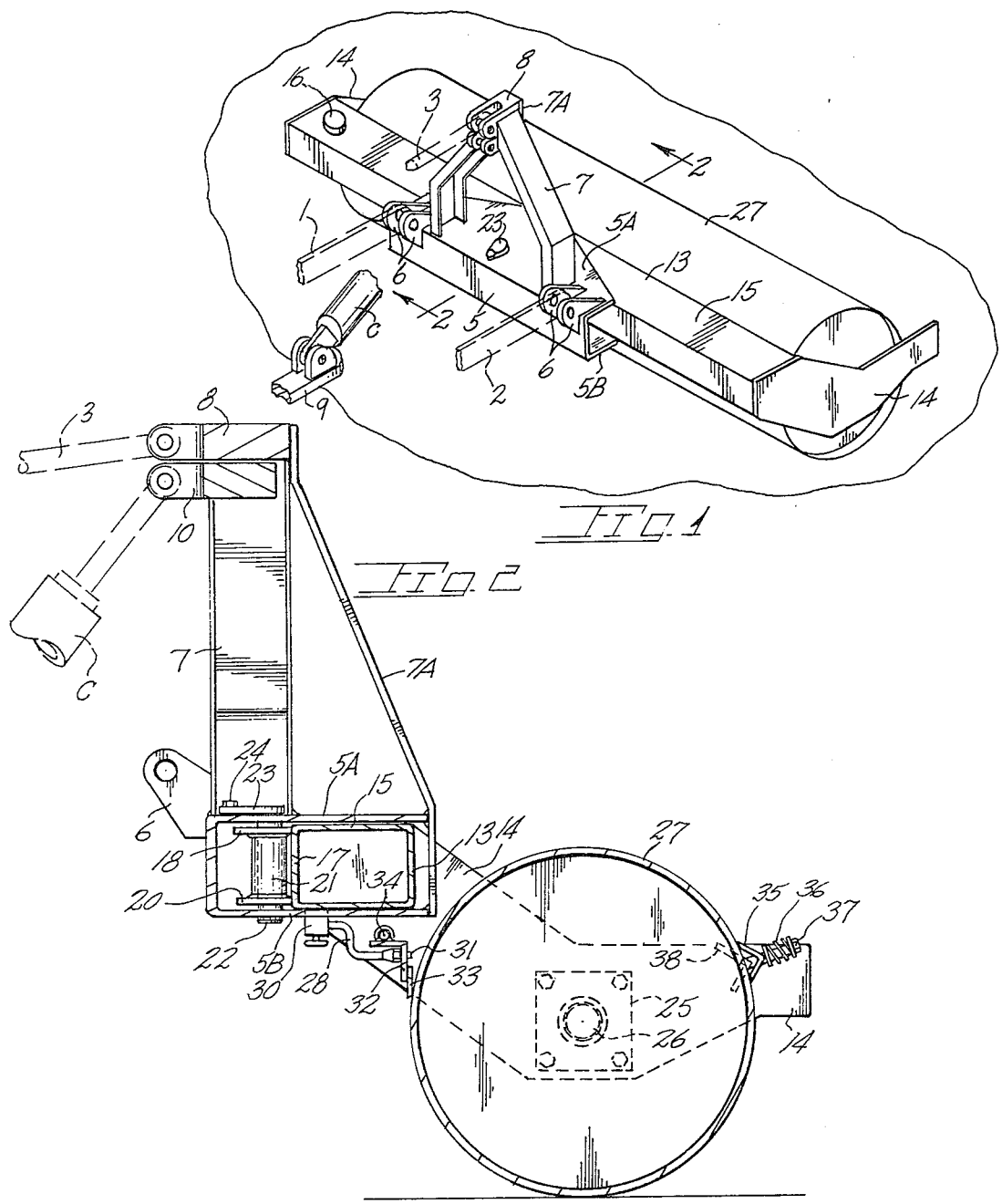

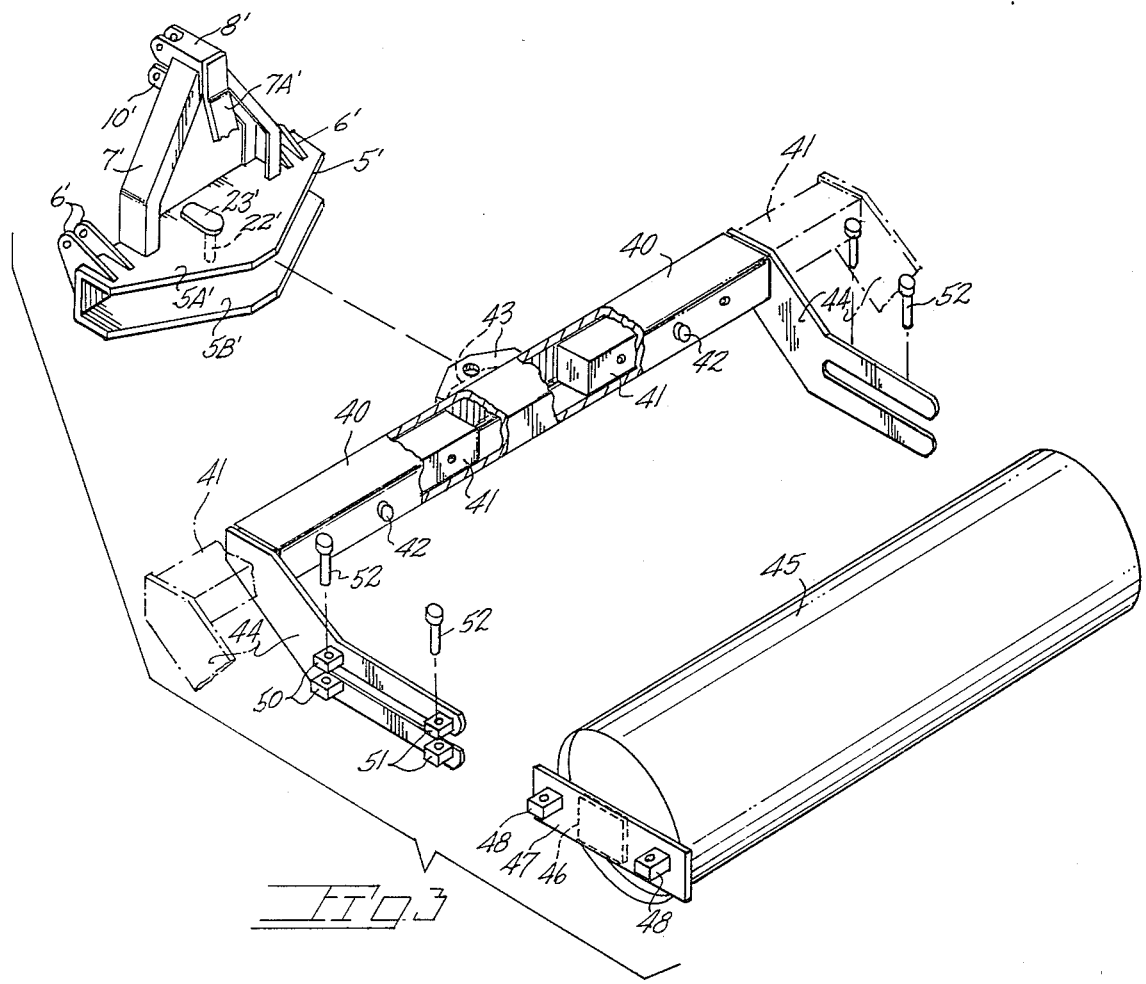

ARTICULATED TRACTOR ATTACHMENT WITH ROLLER

BACKGROUND OF THE INVENTION

The present invention concerns generally an earth working roller of a type for attachment to a tractor with a three point hitch.

Known prior art rollers draft coupled with tractors or other earth working equipment are necessarily of substantial size and weight to accomplish the task of rolling a partially prepared surface preparatory to further roadway work. Such rollers by reason of their size do not lend themselves to convenient use in close quarters such as in the rolling of driveways, parking areas, etc., for the reason that short radius turns are not possible. Further, rollers by reason of their weight are not readily lifted to facilitate turning. The combined length of a tractor and the roller contributes to unwieldy roller operation particularly where a surface must be rolled adjacent a building, curb, fence, etc., in which instances care must be exercised to avoid damaging such structure by a roller swinging thereagainst about the turning axis of the tractor. Accordingly, it is desirable to provide a roller which may track behind the tractor during turning with roller axis being in relatively close proximity to the tractor rear wheels. A further drawback to known roller attachments is the inability of same to utilize hydraulic pressure to contribute to roller down pressure.

SUMMARY OF THE PRESENT INVENTION

The present invention is embodied within an articulated roller attachment for tractors of the type equipped with a three point hitch.

The present attachment includes a transversely disposed roller carried by a frame which additionally serves as a water tank. A clevis-like bracket pivotally supports the tank which is centrally fitted with flanges for reception of a bracket mounted pivot pin. Said bracket additionally supports an A-frame the upper end of which is adapted for securement both to a three point hitch top link and also a hydraulic cylinder. Said cylinder has its base end mounted on the tractor with the rod end imparting downward forces to the roller. Tractor three point hitch arms are received within ears in place on said bracket. Provision is made for water application to and scraping of the roller.

Important objectives of the present roller attachment for tractors include the provision of such an attachment being coupled in an articulated manner to permit maneuvering of the tractor and attachment in areas of restricted clearance; the provision of a roller attachment wherein a water supply tank functions as a frame component contributing to a compact roller attachment; the provision of a roller attachment adaptable to engagement with various sizes of rollers and other instrumentalities; the provision of a roller attachment including means permitting the application of force from a hydraulic cylinder to the roller to increase downward pressure exerted by the roller; the provision of a roller attachment including a clevis-like structure within which is swingably attached a roller frame component to provide an articulated roller closely coupled to the tractor's three point hitch to avoid excessive tractor-attachment length; the provision of a roller frame extensible in width to receive a range of different sized instrumentalities.

BRIEF DESCRIPTION OF THE DRAWING

In the accompanying drawing:

FIG. 1 is a perspective view of the present roller attachment for tractors with tractor hitch components shown in phantom lines;

FIG. 2 is a vertical sectional view of the attachment taken along line 2—2 of FIG. 1; and FIG. 3 is a perspective view of a modified roller attachment extensible for various sized rollers or other instrumentalities.

DETAILED DESCRIPTION OF THE PREFERRED EMBODIMENTS

With continuing attention to the drawing, reference numerals 1 and 2 indicate the rearwardly trailing arms of a tractor three point hitch which conventionally includes an upper control arm 3. Typically, the arms 1 and 2 are vertically adjustable by tractor powered components, not shown, which impart lifting forces to the arms with movement in a downward direction being gravitational. Link 3 of the three point hitch is typically capable of an axial length adjustment as by a threaded component thereof for adjustment of the fore and aft inclination of whatever attachment is being supported by the hitch. A tractor hitch bar at 9 is provided with a clevis for the mounting of the base end of a hydraulic cylinder C for later elaborated purposes.

With attention now to the present roller attachment, a C-shaped bracket at 5 has a rearwardly directed bight and is provided with pairs of ears 6 for coupled reception of the trailing ends of hitch arms 1 and 2. Bracket 5 includes upper and lower plates 5A-5B which extend rearwardly a distance of several inches. Upper plate 5A supports an A-frame 7 at the apex of which is located a clevis 8 within which is coupled the trailing end of three point hitch member 3. At 7A is an A-frame brace. A lower or secondary clevis at 10 is carried by A-frame 7 below the first mentioned clevis and serves to pivotally receive the rod end of hydraulic cylinder C the base end of which, as earlier noted, is pivotally supported on the tractor hitch 9. Extension of the cylinder piston rod causes downward rotation of bracket 5 about the aligned axes of the hitch pins coupling hitch arms 1 and 2 to bracket mounted ears 6. Such extension results in increased roller pressure on the ground surface being worked.

A roller frame is indicated at 13 and includes side members 14 and a main transverse member 15. Desirably, transverse member 15 is of closed wall construction to constitute a water storage tank having a filler cap 16. A frontal wall 17 of transverse frame member 15 is provided with centrally located, forwardly directed flanges 18 and 20. Pivot means includes a bearing sleeve 21. A pivot pin 22 extends through said upper and lower bracket plates 5A and 5B, flanges 18 and 20, and bearing sleeve 21 to swingably couple the roller frame to bracket 5. Pivot pin 22 is integral with a keeper 23 retained against accidental dislodgement by a bolt 24 in threaded engagement with the bracket. From the foregoing it will be evident that frame 13 and the later described roller may assume angular relationships with the tractor about the axis of pin 22 to provide articulated movement. Side members 14 of the frame extend downwardly and rearwardly and thereat receive bearing plates as at 25 within each of which is journaled a roller shaft 26. The roller at 27 is of conventional construction having internal partitions which additionally serve as baffles to prevent surging of water ballast in the roller. Water is applied to the roller surface by means of a supply line 28 served by a valve 30 in communication with the interior of transverse tank member 15 which constitutes a water supply tank in the preferred form of the invention. Nozzles as at 31 are carried along an angle 32 extending the length of the roller. Said angle also carries a wiper 33 which gravitates into roller contact by reason of angle 32 being pivotally supported by pintles as at 34 projecting through bosses formed in side members 14. Extending intermediate the rearward ends of side members 14 is a roller scraper bar 35 shown as a length of angle iron biased at its ends into roller engagement as by springs 36 each supported by a bolt 37 the forward end of which is in threaded engagement with an inwardly projecting stub flange segment 38 on each inner side of member 14.

In FIG. 3, a modified roller frame is illustrated which makes provision for supporting engagement with ground engaging instrumentalities of various lengths. The bracket utilized with the modified roller frame is as earlier described with prime reference numerals indicating parts analagous to earlier described parts. Said bracket is equally adaptable for use with the tractor hitch bar mounted cylinder C earlier described.

A roller frame includes a box beam 40 open at its ends to receive in telescopic fashion extensible beam members 41. Registerable openings in the box beam and beam members receive locking pins 42 to rigidly interconnect the box beam and its telescopic beam members to provide a desired overall length to the roller frame. Forwardly directed upper and lower flanges at 43 receive pivot pin 22' to provide pivot means swingably coupling the frame to the bracket similar to the first form of the invention.

Side members at 44 trail rearwardly from the outer ends of the telescopic beam members with rearmost segments adapted to be coupled to a roller at 45. Said roller, as well as first mentioned roller 27, may be of the type within which water may be utilized as ballast for a weight increasing medium. As typically shown, bearing plates as at 46 are offset from the roller ends and each provided with a bearing (unseen) within which is journaled a roller shaft. Coupling means includes a support plate 47 having bosses 48 positionable intermediate pairs of bosses 50 and 51 on each beam side member 44 to permit insertion of locking pins 52. It is to be understood that while the description of the present attachment is with reference to a roller such is not intended to imply a limited use of the present attachment as it is believed obvious that other ground engaging instrumentalities may be coupled to the frame using like coupling means. The term roller is presently intended to be synonomous with other ground working instrumentalities such as harrows, rakes, etc., fitted with support plates 47 so as to be compatible with the side member mounted coupling components.

In the first described preferred embodiment of the invention the roller frame is constructed from a box beam of approximately six feet in length with bracket plates 5A-5B spaced to slidably engage upper and lower beam surfaces. The bracket is approximately three feet in length with the plates being thirteen inches at their longest rearward dimension. The uppermost bracket mounted clevis 8 provides an attachment point vertically spaced at a distance of twenty inches or so from the three point hitch attachment points provided by ears 6. Pivot pin 22 extends through the bracket plates as well as through a sleeve mounted intermediate beam mounted flanges 18 and 20 with the collar having an internal diameter of about two inches to receive pivot pin 22. The attachment bracket is preferably fabricated from three-eighths inch metal shock with the upright frame formed from channel stock.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A roller attachment for articulated attachment to a tractor of the type having a vertically positionable three point hitch, said attachment comprising, a bracket including an upright frame, said bracket adapted for pivotal attachment to the trailing ends of the tractor's three point hitch components, said bracket having upper and lower rearwardly directed parallel plates, a roller frame and roller carried by said bracket and normally extending transversely of the path of tractor travel, said roller frame including a box beam disposed for a portion of its length between said parallel plates and against which portion vertically orientated forces may be imparted to the roller frame by said bracket, pivot means carried by said bracket coupling said box beam to said bracket between said plates to permit box beam swinging movement about said pivot means and relative to said bracket during turning of the tractor whereby swinging of the roller frame and roller in a direction opposite to the tractor turning direction is avoided, and said roller frame additionally including extensible members positionable and lockable axially of the box beam, side members affixed to the outer ends of the extensible members, coupling means intermediate the ends of said roller and each of said side members to permit convenient roller removal and substitution of a roller of different length subsequent to axial adjustment of said extensible members.

2. The roller attachment claimed in claim 1 wherein said roller frame is of walled structure to constitute a water tank to provide a water supply for application to roller surfaces, nozzles supported by said roller frame in discharging relationship with the roller to apply water thereto.

3. The roller attachment claimed in claim 1 wherein said upright frame of the bracket includes a first clevis at its upper end for reception of the end of a hydraulic cylinder piston rod of a tractor carried hydraulic cylinder, extension of said piston rod by the cylinder causing said bracket and roller frame and roller to be downwardly biased toward the ground surface.

4. The roller attachment claimed in claim 3 wherein said upright frame additionally includes a second clevis for reception of a tractor three point hitch control arm.

5. The roller attachment claimed in claim 1 wherein said roller frame includes forwardly directed flange means disposed within said bracket, said pivot means disposed in inserted engagement with the bracket plates and said roller frame flange means.

6. The roller attachment claimed in claim 1 wherein said side members each define an elongate opening, said coupling means including bosses slidably positionable within each side member opening and locking pins insertable within each of said bosses.

* * * * *